(12) United States Patent
Hirakawa et al.

(10) Patent No.: US 9,065,995 B2
(45) Date of Patent: Jun. 23, 2015

(54) TELEVISION LENS APPARATUS

(71) Applicant: FUJIFILM Corporation, Tokyo (JP)

(72) Inventors: Akinobu Hirakawa, Saitama (JP); Atsushi Misawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/198,236

(22) Filed: Mar. 5, 2014

(65) Prior Publication Data

US 2014/0184886 A1 Jul. 3, 2014

Related U.S. Application Data

(63) Continuation of application No. PCT/JP2012/072140, filed on Aug. 31, 2012.

(30) Foreign Application Priority Data

Sep. 6, 2011 (JP) ................................. 2011-193930

(51) Int. Cl.
*H04N 5/225* (2006.01)
*H04N 5/232* (2006.01)
*G02B 7/09* (2006.01)
*G02B 7/10* (2006.01)

(52) U.S. Cl.
CPC ......... *H04N 5/2254* (2013.01); *H04N 5/23209* (2013.01); *G02B 7/09* (2013.01); *G02B 7/102* (2013.01); *H04N 5/2252* (2013.01)

(58) Field of Classification Search
USPC ........................................ D16/200, 207, 212
See application file for complete search history.

(56) References Cited

U.S. PATENT DOCUMENTS

| 5,221,964 | A | * | 6/1993 | Chamberlain et al. | ......... 348/373 |
| 5,332,031 | A | * | 7/1994 | Kiga | ................ 165/86 |
| 7,634,193 | B2 | * | 12/2009 | Lang et al. | ..................... 396/542 |
| 7,859,592 | B2 | | 12/2010 | Takahashi et al. | |
| 2003/0030748 | A1 | * | 2/2003 | Jung | ............... 348/373 |
| 2003/0194230 | A1 | * | 10/2003 | Tamura | ........................ 396/427 |
| 2004/0114919 | A1 | * | 6/2004 | Rife | ............................ 396/494 |
| 2008/0007624 | A1 | * | 1/2008 | Schultz et al. | ........... 348/207.99 |

(Continued)

FOREIGN PATENT DOCUMENTS

| JP | 1-145184 U | 10/1989 |
| JP | 5-81848 A | 4/1993 |

(Continued)

OTHER PUBLICATIONS

International Search Report issued in PCT/JP2012/072140, mailed on Nov. 6, 2012.

(Continued)

*Primary Examiner* — Albert Cutler
(74) *Attorney, Agent, or Firm* — Birch, Stewart, Kolasch & Birch, LLP (57) ABSTRACT

A television lens apparatus in which circuit boards can be easily mounted or dismounted and can be easily wired is provided. A lens barrel is contained in a housing. A housing opening is formed in the lens barrel to be opened and closed with a rotatable lid. A board holding device is fixed on a rear portion of the lens barrel. In the board holding device, four connectors are mounted on a wiring board and arranged in an axial direction of the lens barrel. Four circuit boards are inserted in the connectors through the housing opening in a direction perpendicular to the lens barrel.

10 Claims, 10 Drawing Sheets

(56) References Cited

U.S. PATENT DOCUMENTS

| | | |
|---|---|---|
| 2008/0111914 A1 | 5/2008 | Takahashi et al. |
| 2009/0284644 A1* | 11/2009 | McKaughan et al. ........ 348/348 |
| 2011/0286735 A1* | 11/2011 | Tremblay ..................... 396/427 |

FOREIGN PATENT DOCUMENTS

| | | |
|---|---|---|
| JP | 9-179013 A | 7/1997 |
| JP | 9-252190 A | 9/1997 |
| JP | 2000-332464 A | 11/2000 |
| JP | 2005-352281 A | 12/2005 |

OTHER PUBLICATIONS

PCT/ISA/237—Issued in PCT/JP2012/072140, mailed on Nov. 6, 2012.

Notification of Transmittal of Translation of the International Preliminary Report on Patentability issued in PCT/JP2012/072140 on Mar. 6, 2014.

Extended European Search Report, dated Mar. 17, 2015, for European Application No. 12829845.2.

* cited by examiner

TELEVISION LENS APPARATUS

CROSS REFERENCE TO RELATED APPLICATIONS

This application is a continuation of PCT International Application No. PCT/JP2012/072140 filed on Aug. 31, 2012, which claims priority under 35 U.S.C 119(a) to Application No. 2011-193930 filed on Sep. 6, 2011 in Japan, all of which are hereby expressly incorporated by reference into the present application.

BACKGROUND OF THE INVENTION

1. Field of the Invention

The present invention relates to a television lens apparatus for use with a broadcast television camera and the like.

2. Description Related to the Prior Art

A broadcast television camera includes a camera tube, imaging plate or the like, and used for an indoor imaging in a studio and the like, and outdoor imaging for sport broadcasting and the like. A television lens apparatus in a quadrilateral box shape is attached to the broadcast television camera removably (see U.S. Pat. No. 7,859,592 corresponding to Japanese Patent Laid-open Publication No. 2008-124913).

Operable devices, such as a focus demand device and a zoom demand device, are connected to the television lens apparatus by a cable or the like. According to the command from the operable devices, focus adjustment and magnification adjustment of the television lens apparatus are carried out. Also, various types of electronic circuits are provided in the television lens apparatus for iris control or the like in addition to the focus adjustment and magnification adjustment.

Assuming that all of the electronic circuits in the television lens apparatus are constituted by a single circuit board, the circuit board is difficult to contain in a housing of the television lens apparatus because of a large size. Also, the maintainability of the electronic circuits is poor, as all the electronic circuits must be exchanged assuming that only one portion of the electronic circuits is broken.

In the television lens apparatus, therefore, circuit boards are constituted by each of function modules such as a control circuit board for the focus adjustment and a control circuit board for the magnification adjustment, to constitute one electronic circuit by internal wiring of the circuit boards. In such a modular structure, disposition of the circuit boards in the housing is facilitated as the size reduction of the circuit boards is possible. Its maintainability can be higher as only one of the circuit boards being broken should be exchanged.

As described in U.S. Pat. No. 7,859,592, the housing of the television lens apparatus is in a box shape (prismatic tube), and fully covers an outer surface of the lens barrel. Each of the circuit boards is attached to a lateral surface of the lens barrel to be contained in a space between the lens barrel and the housing. Assuming that the circuit boards are broken, the lens barrel must be removed from the housing together with the circuit boards, so that handlability has not been always good. Manipulation for wiring has been very laborious as the circuit boards are interconnected with a cable or the like after attaching the circuit boards to the lateral surface of the lens barrel.

SUMMARY OF THE INVENTION

In view of the foregoing problems, an object of the present invention is to provide a television lens apparatus in which circuit boards can be easily mounted or dismounted and can be easily wired.

In order to achieve the above and other objects and advantages of this invention, a television lens apparatus having an imaging optical system for focusing an object image, a lens barrel for holding the imaging optical system, and a housing for covering and protecting the imaging optical system and the lens barrel is provided. In the television lens apparatus, plural circuit boards controls the television lens apparatus, each of the circuit boards being substantially in a plate shape, wherein a cutout is formed in one side line of each of the circuit boards in compliance with a shape of the lens barrel, and an insert portion is formed near to a center of the cutout. A board holding device holds the circuit boards removably to contain the plural circuit boards in a space between the lens barrel and the housing, wherein the board holding device includes plural connectors positioned in alignment with an optical axis of the imaging optical system and having a receiving opening for entry of the insert portion, and a wiring board for electrical connection with the circuit boards entered in respectively the connectors, wherein the board holding device is mounted on a lateral surface of the lens barrel to set a center of the respective receiving opening at a height substantially equal to a height of a central axis of the lens barrel. A housing opening is formed in the housing, for enabling mounting and dismounting of the plural circuit boards with the board holding device. There is a lid for opening and closing the housing opening.

Preferably, the lens barrel is cylindrical with a front portion of a large diameter and a rear portion of a small diameter, and the board holding device is mounted on the rear portion. The housing is in a shape of a prismatic tube.

Preferably, the connector supports the circuit board in a state substantially perpendicular to the optical axis.

Preferably, each of the connectors is coupled to the wiring board in a rotatable manner between a first position for orienting the receiving opening to the housing opening and a second position for inclining the receiving opening relative to the housing opening.

In another preferred embodiment, the connectors support respectively the circuit boards in a direction of setting surfaces of the circuit boards substantially in parallel with the optical axis and substantially flush with one another.

In still another preferred embodiment, the lid is coupled to the housing in a rotatable manner to move between an open position for uncovering the housing opening to enable mounting and dismounting of the circuit boards and a closed position for closing the housing opening.

Preferably, each of the circuit boards includes an adjustable circuit device in which an electronic circuit as desired is settable with software, and the circuit boards are boards with a common shape and common electrical structure.

Preferably, the optical system has a focus lens, a zoom lens, a correction lens, a relay lens and an iris device.

Preferably, the plural circuit boards are set in any one of electronic circuits including a focus control circuit for moving the focus lens for focus adjustment, a zoom control circuit for moving the zoom lens and the correction lens for magnification adjustment, and an iris control circuit for controlling the iris device.

Preferably, the circuit boards are respectively common circuit boards of which a shape and electrical structure are equal.

In the television lens apparatus of the present invention, it is possible easily to mount and dismount respective circuit boards relative to the board holding device through the housing opening uncovered by opening the lid. Upon mounting the circuit boards on the board holding device, the circuit boards are electrically interconnected by the board holding device. It is unnecessary to interconnect the circuit boards with a cable or the like, to save labor of the wiring.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

First Embodiment

Figure 1:
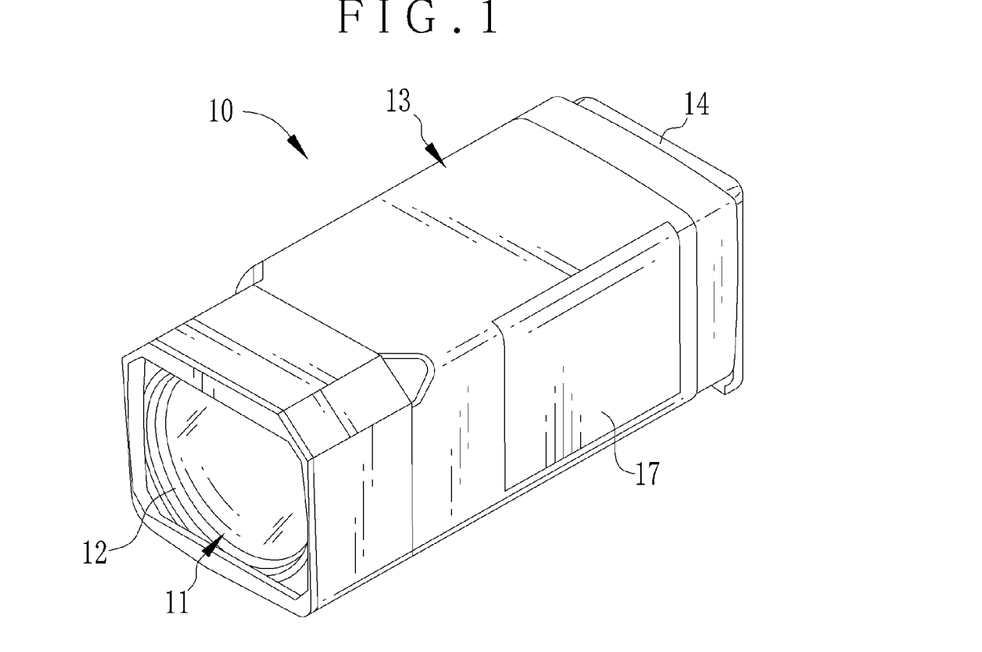
FIG. 1 is a perspective illustrating a first embodiment of a television lens apparatus of the present invention.

As illustrated in FIG. 1, a television lens apparatus 10 includes an imaging optical system 11, a lens barrel 12, a housing 13 and amount 14, the imaging optical system 11 focusing an object image, the lens barrel 12 holding the imaging optical system 11, the housing 13 containing the lens barrel 12, the mount 14 coupling the television lens apparatus 10 to a television camera apparatus (not shown) in a removable manner.

The imaging optical system 11 is constituted by a plurality of lens groups, an iris device and the like. The lens barrel 12 is cylindrical (see FIG. 3). The housing 13 is in a shape of a quadrilateral prism, and nearly as long as the lens barrel 12. The housing 13 covers an outer surface of the lens barrel 12 so as to uncover an entrance end and exit end of the imaging optical system 11 at its two ends.

Figure 2:
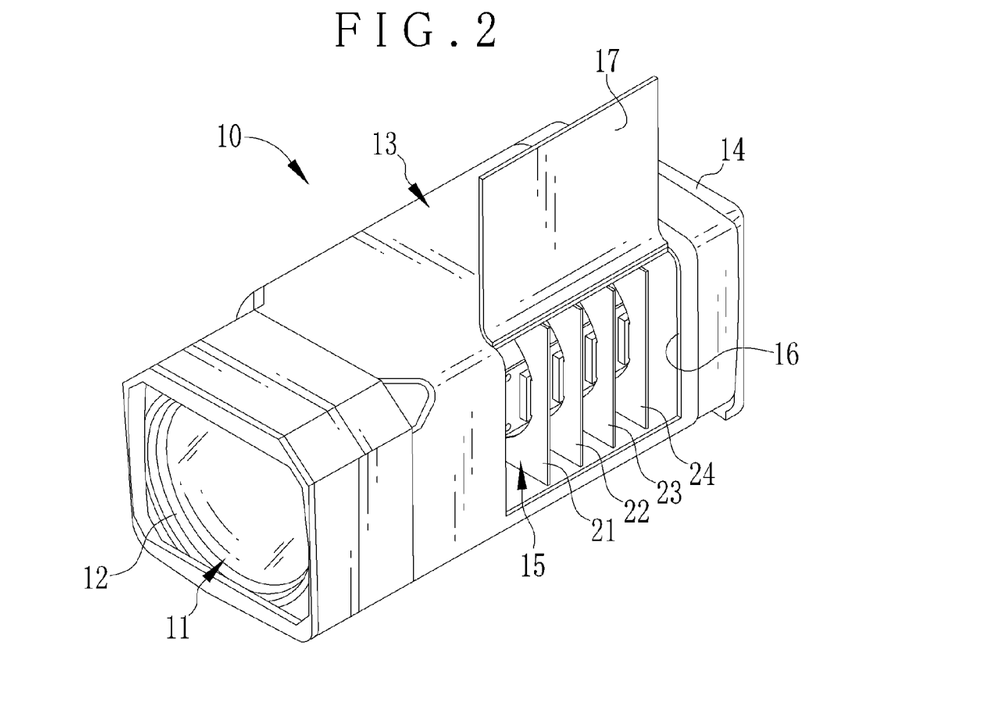
FIG. 2 is a perspective illustrating the first embodiment in a state of opening a lid.

As illustrated in FIG. 2, a board holding device 15 is contained in the housing 13. The board holding device 15 is disposed in a space defined between the lens barrel 12 and the housing 13. The board holding device 15 supports first to fourth circuit boards 21-24 for controlling the television lens apparatus 10 in a removable manner. The circuit boards 21-24 are formed in a substantially equal shape. The board holding device 15 supports the circuit boards 21-24 in alignment in an optical axis direction to extend transversely to the optical axis of the imaging optical system 11.

A housing opening 16 is formed in a lateral surface of the housing 13 for uncovering the board holding device 15. The housing opening 16 is quadrilateral and large enough to mount and dismount the circuit boards 21-24 in relation to the board holding device 15. A rotatable lid 17 is connected to the housing 13 by hinges. The lid 17 is movable between an open position for enabling mounting and dismounting of each of the circuit boards 21-24 by uncovering the housing opening 16 and a closed position for closing the housing opening 16.

The circuit boards 21-24 supported on the board holding device 15 are covered and protected by the housing 13 and the lid 17 in the closed position. Assuming that breakage occurs with the circuit boards 21-24, the lid 17 can be moved to the open position to facilitate the mounting and dismounting of the circuit boards 21-24 through the housing opening 16. It is preferable to lock the lid 17 in the closed position by use of screws or the like.

Figure 3:
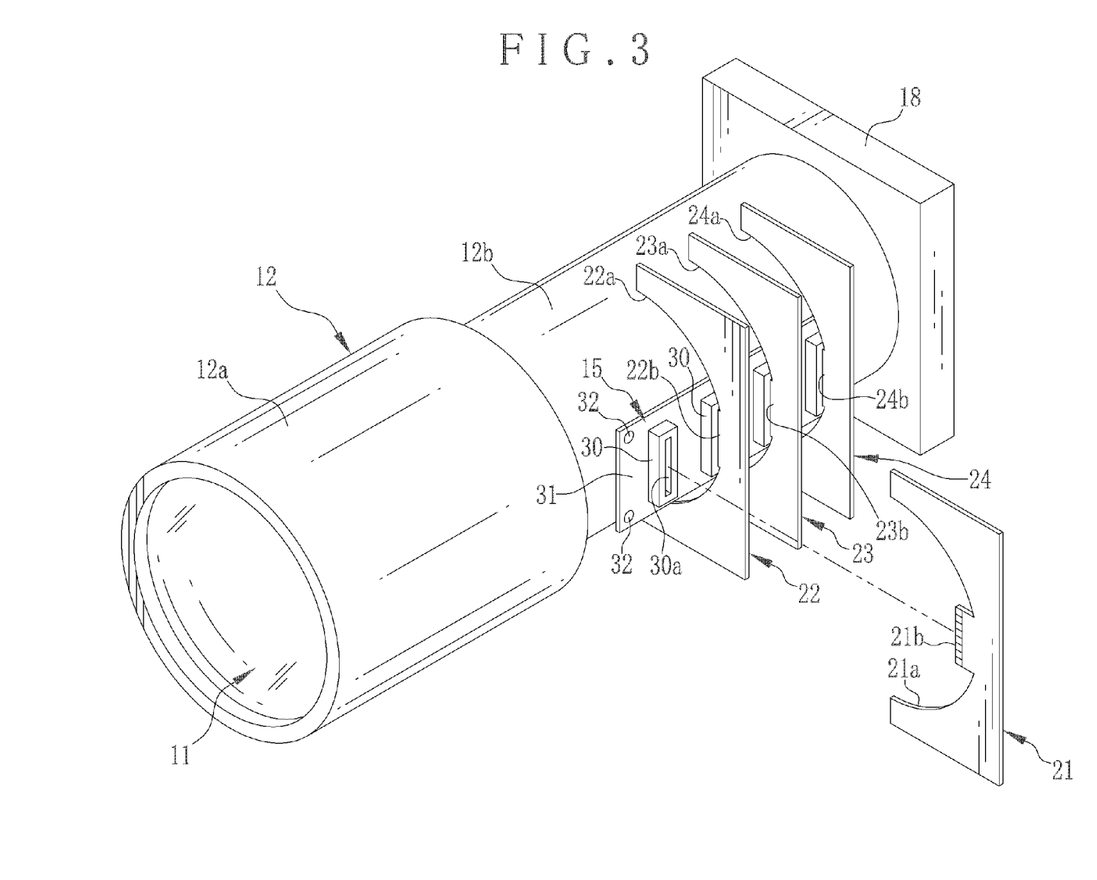
FIG. 3 is a perspective illustrating a lens barrel in a housing.

As illustrated in FIG. 3, the lens barrel 12 has a front portion 12a and a rear portion 12b. The rear portion 12b has a smaller diameter than the front portion 12a. The shape of the lens barrel 12 is derived from the form of the respective lenses included in the imaging optical system 11 to decrease in a direction toward the exit end. A mount frame 18 is disposed at an end of the rear portion 12b for partially constituting the mount 14 upon being contained in the housing 13.

As the board holding device 15 is attached to the lateral surface of the rear portion 12b with the smaller diameter, the size of the circuit boards 21-24 can be enlarged. Moving the circuit boards 21-24 in and out is also easy.

Figure 4:
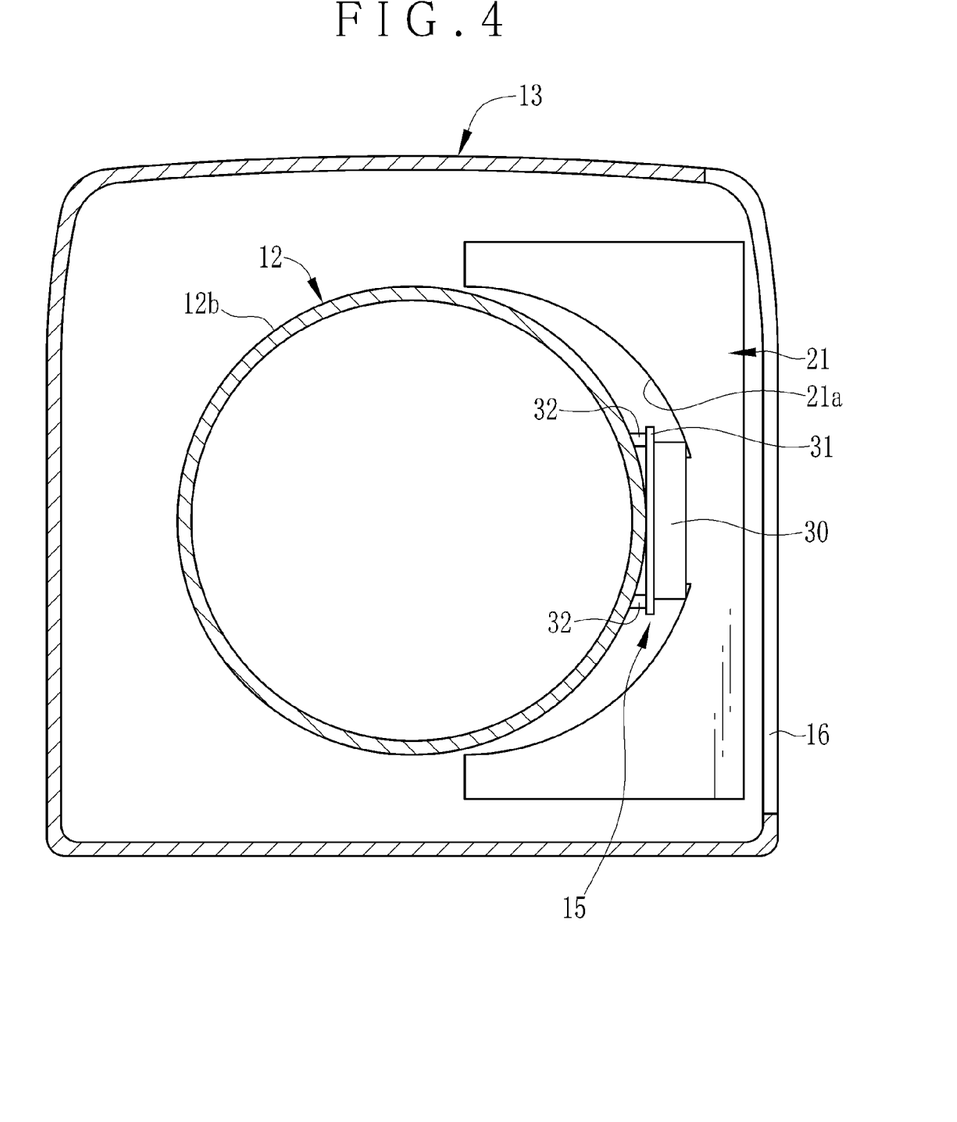
FIG. 4 is a section illustrating a television lens apparatus.

As illustrated in FIGS. 3 and 4, a substantially semicircular cutout 21a is formed in the first circuit board 21 at one of longer side lines of the quadrilateral according to a diameter of the rear portion 12b. A quadrilateral insert portion 21b projects from the vicinity of the center of the first circuit board 21 for insertion in the board holding device 15. Plural electrodes are disposed on the insert portion 21b for use in electrical connection with the board holding device 15. The second to fourth circuit boards 22-24 are constructed similarly to the first circuit board 21, so that their explanation is omitted.

The board holding device 15 is constituted by four connectors 30 and a quadrilateral wiring board 31, the connectors 30 being associated with respectively the circuit boards 21-24, the wiring board 31 supporting each of the connectors 30. Each of the connectors 30 has a receiving opening 30a for receiving entry of insert portions 21b-24b of the circuit boards 21-24. The entry to the receiving opening 30a electrically interconnects the circuit boards 21-24, and mechanically keeps those supported. The connectors 30 are attached to the wiring board 31 at a constant interval so as to arrange longer side lines of the receiving opening 30a parallel with one another.

On the wiring board 31 are provided connection circuits for electrically interconnecting the circuit boards 21-24 inserted in respectively the connectors 30. Thus, it is possible to couple the circuit boards 21-24 only by inserting each of the insert portions 21b-24b of the circuit boards 21-24 into the receiving opening 30a of the connectors 30, and to interconnect the circuit boards 21-24 electrically.

Substantially circular through holes are formed at four corners of the wiring board 31. Four bosses 32 are formed on the rear portion 12b of the lens barrel 12 to project toward the housing opening 16. The board holding device 15 is attached to a lateral side of the rear portion 12b of the lens barrel 12 by engaging the through holes of the wiring board 31 with respectively the bosses 32. This being so, the connectors 30 are arranged in the optical axis direction in a state of orienting the receiving openings 30a to the housing opening 16. A center of each of the receiving opening 30a is positioned substantially as high as the central axis of the lens barrel 12.

Accordingly, the board holding device 15 supports the circuit boards 21-24 arranged in the optical axis direction in such a state that the surface of each of the circuit boards 21-24 is substantially perpendicular to the optical axis of the imaging optical system 11 and cutouts 21a-24a are fitted on the outer surface of the lens barrel 12.

Figure 5:
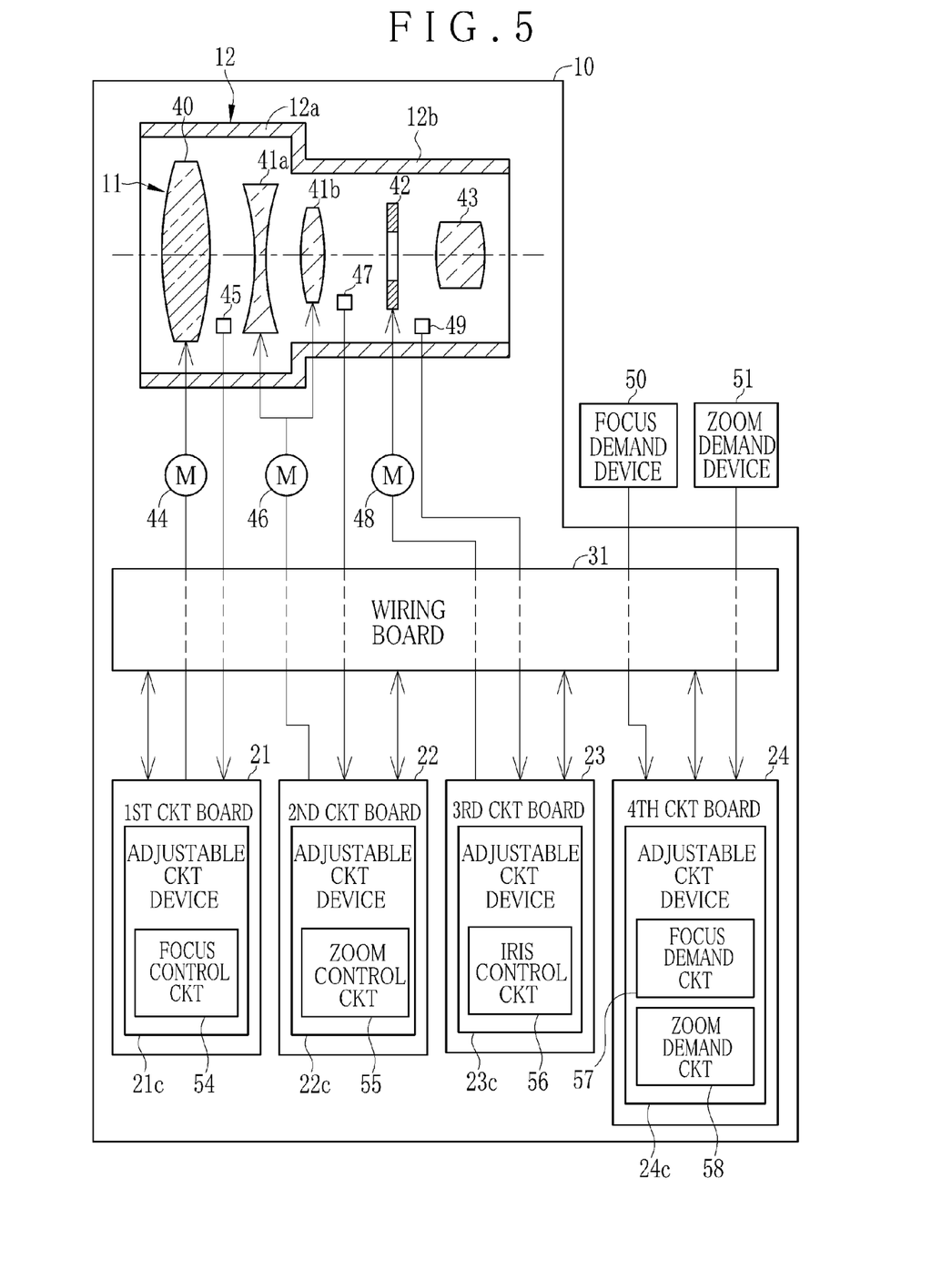
FIG. 5 is a block diagram illustrating electrical construction of the television lens apparatus.

As illustrated in FIG. 5, the imaging optical system 11 includes a focus lens group 40 for focus adjustment, a zoom lens group 41a and a correction lens group 41b for magnification adjustment, an iris device 42 for adjusting a light amount, and a relay lens group 43 for transmitting a focused object image to the television camera apparatus. Each of the lens groups 40, 41a, 41b and 43, although depicted simply by one lens, is constituted actually by plural lenses. Of course, each of the lens groups 40, 41a, 41b and 43 can be one lens.

The focus lens group 40, the zoom lens group 41a and the correction lens group 41b are kept contained in the lens barrel 12 movably with respective lens holders as is well-known in the art. At the time of focus adjustment, the focus lens group 40 moves in the optical axis direction to adjust the focus of the imaging optical system 11 according to a subject distance. At the time of adjusting the magnification, the zoom lens group 41a moved in the optical axis direction according to a focal length. The correction lens group 41b moves to compensate for an offset in the focusing according to the zoom lens group 41a.

The television lens apparatus 10 includes a focus motor 44 for moving the focus lens group 40 in the optical axis direction by use of a focus ring or screw shaft, and a focus sensor 45 for detecting a position of the focus lens group 40. Also, there are provided a zoom motor 46 for moving the zoom lens group 41a and the correction lens group 41b in the optical axis direction, and a zoom sensor 47 for detecting their positions. Also, there are provided an iris motor 48 for driving the iris device 42, and an iris sensor 49 for detecting an adjustment amount of the iris device 42. The motors 44, 46 and 48 and the sensors 45, 47 and 49 are attached to the inside of the lens barrel 12. Also, the motors 44, 46 and 48 and the sensors 45, 47 and 49 are respectively connected to the wiring board 31 electrically.

A focus demand device 50 as an external operable device for focus adjustment, and a zoom demand device 51 as an operable device for magnification adjustment are attached to a camera stand for supporting the television camera apparatus in a rotatable manner. The focus demand device 50 and the zoom demand device 51 are connected to the television lens apparatus 10 by a connector, cable or the like. Note that the focus demand device 50 and the zoom demand device 51 can be connected to the television camera apparatus. For this structure, the television camera apparatus is connected to the wiring board 31 in the television lens apparatus 10 with contact points and wiring in the mount 14.

The focus demand device 50 has a rotatable operation wheel (not shown). The focus demand device 50 generates a focus demand signal according to a rotational operation amount and operating direction of the operation wheel, and inputs the focus demand signal to the television lens apparatus 10. The zoom demand device 51 includes a thumb ring (not shown) rotatable in two directions from a reference position. The zoom demand device 51 generates a zoom demand signal according to a rotational operation amount and operating direction of the thumb ring, and inputs the zoom demand signal to the television lens apparatus 10.

Adjustable circuit devices 21c-24c are provided in respectively the circuit boards 21-24. The adjustable circuit devices 21c-24c are constituted by a programmable logic device such as an FPGA, and a rewritable non-volatile memory such as an EEPROM, and can be set up for an electronic circuit (functional circuit) as desired by use of software.

The circuit boards 21-24 are common circuit boards having the same shape and the same electrical construction. In the television lens apparatus 10, the adjustable circuit devices 21c-24c of the circuit boards 21-24 are set up for electronic circuits different from one another, to function the circuit boards 21-24 differently from one another.

Thus, a manufacturing cost can be decreased in comparison with discrete preparation of special circuit boards owing to the common specifics of the circuit boards 21-24. Addition and change of the functions can be carried out easily only by changing the electronic circuits in the adjustable circuit devices 21c-24c. Furthermore, breakage of any one of the circuit boards 21-24 can be coped with by preparing one new circuit board, to keep a maintaining expense low for the television lens apparatus 10.

The adjustable circuit device 21c of the first circuit board 21 is set up as a focus control circuit 54 for controlling the focus adjustment of the imaging optical system 11. The adjustable circuit device 22c of the second circuit board 22 is set up as a zoom control circuit 55 for controlling the magnification adjustment of the imaging optical system 11. The adjustable circuit device 23c of the third circuit board 23 is set up as an iris control circuit 56 for controlling the iris device 42 of the imaging optical system 11. The adjustable circuit device 24c of the fourth circuit board 24 is set up as a focus demand circuit 57 and a zoom demand circuit 58.

The circuit boards 21-24 are connected with one another electrically by the wiring board 31. The fourth circuit board 24 is electrically connected to the focus demand device 50 and the zoom demand device 51 by the wiring board 31. The focus demand circuit 57 receives a focus demand signal from the focus demand device 50, and inputs the focus demand signal to the focus control circuit 54 in the first circuit board 21. The zoom demand circuit 58 receives a zoom demand signal from the zoom demand device 51, and then inputs the zoom demand signal to the zoom control circuit 55 of the second circuit board 22.

The first circuit board 21 is electrically connected to the focus motor 44 and the focus sensor 45 by the wiring board 31. The focus control circuit 54 drives the focus motor 44 according to a detection result of the focus sensor 45 and a focus demand signal from the focus demand circuit 57, and adjusts the focus of the imaging optical system 11 by moving the focus lens group 40 in the optical axis direction.

The second circuit board 22 is electrically connected to the zoom motor 46 and the zoom sensor 47 by the wiring board 31. The zoom control circuit 55 drives the zoom motor 46 according to a detection result of the zoom sensor 47 and a zoom demand signal from the zoom demand circuit 58, and adjusts the magnification of the imaging optical system 11 by moving the zoom lens group 41a and the correction lens group 41b respectively in the optical axis direction.

For use of the television lens apparatus 10, the television lens apparatus 10 is mounted on the front side of the television camera apparatus, and connected to the focus demand device 50 and the zoom demand device 51 by a cable or the like. An operation wheel of the focus demand device 50, a thumb ring of the zoom demand device 51 and the like are operated to carry out the focus adjustment, magnification adjustment and light amount adjustment.

For example, assuming that the first circuit board 21 is broken, the focus control circuit 54 is set up in an adjustable circuit device of a new circuit board designed commonly, to construct the first circuit board 21 newly. Then the lid 17 of the television lens apparatus 10 is moved from the closed position to the open position. The first circuit board 21 being broken is pulled out of the board holding device 15 through the housing opening 16. Then the insert portion 21b of the first circuit board 21 formed newly is inserted in the receiving opening 30a of a corresponding one of the connectors 30 to connect the new first circuit board 21 to the board holding device 15.

This being so, it is possible easily to mount and dismount each of the circuit boards 21-24 through the housing opening 16 by opening the lid 17. As the circuit boards 21-24 are respectively supported on the board holding device 15, the circuit boards 21-24 are electrically connected to one another by the wiring board 31. Thus, no cable or the like can be used for interconnecting the circuit boards 21-24. Manipulation for the wiring can be saved.

Figure 6:
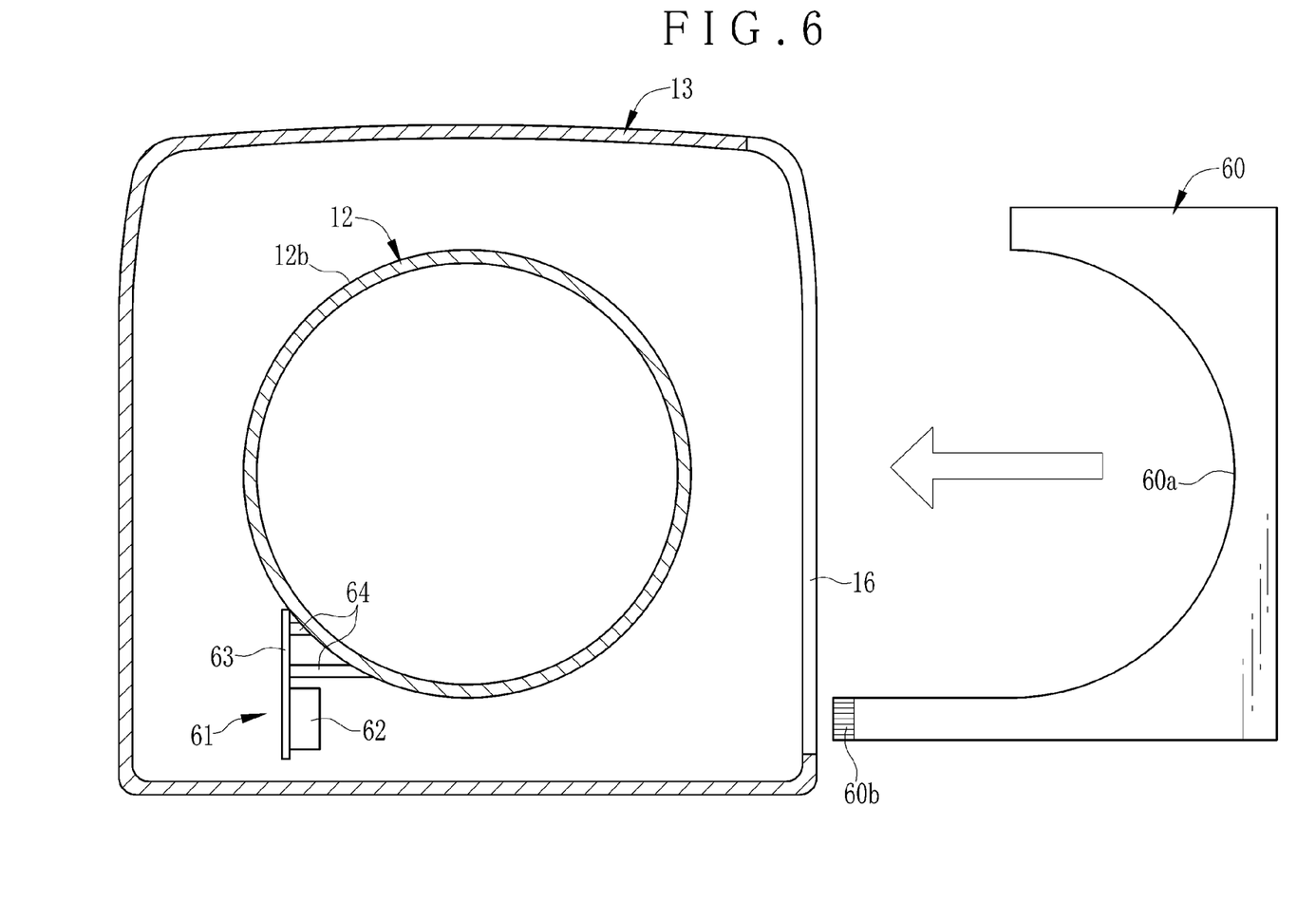
FIG. 6 is a section illustrating a state of inserting a circuit board.
Figure 7:
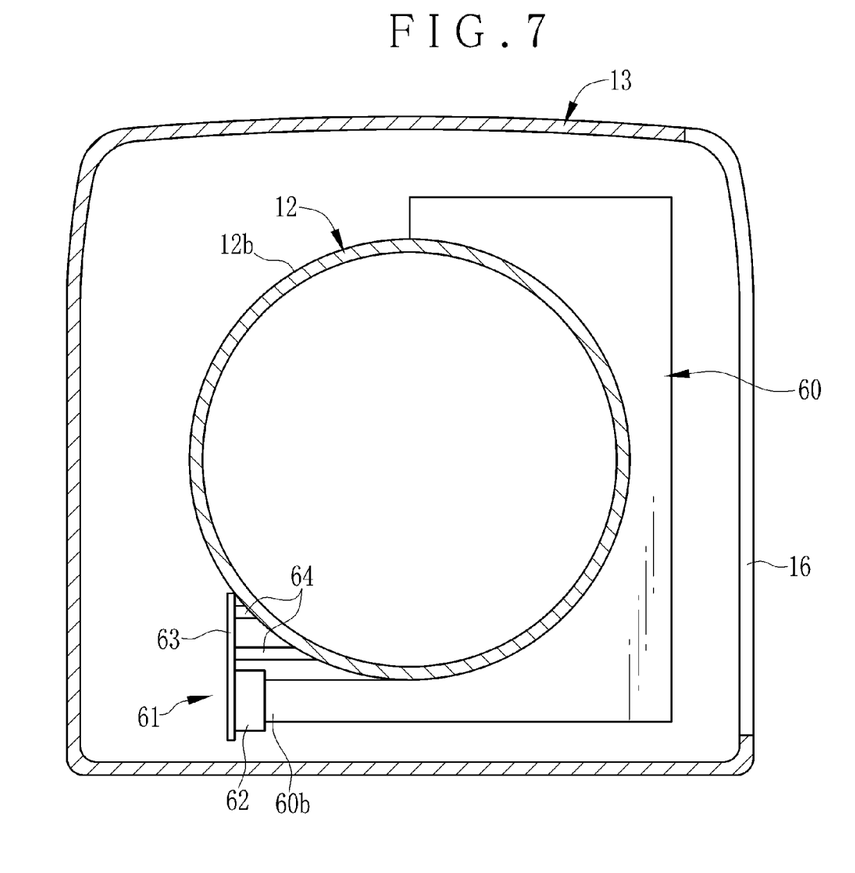
FIG. 7 is a section illustrating the television lens apparatus in a state of setting the circuit board.

In the above embodiment, the insert portion 21b is formed near to the center of the cutouts 21a-24a of respectively the circuit boards 21-24. However, a circuit board 60 and a board holding device 61 can be provided as illustrated in FIGS. 6 and 7. A substantially semicircular cutout 60a is formed in the circuit board 60. A quadrilateral insert portion 60b is formed by elongating a lower portion of the circuit board 60 without having the cutout 60a.

In a manner similar to the above embodiment, the board holding device 61 is constituted by a connector 62 and a wiring board 63. A quadrilateral receiving opening is formed in each of the connector 62 in compliance with a shape of the insert portion 60b. The board holding device 61 is attached to the lateral side of the rear portion 12b of the lens barrel 12 by use of bosses 64, so as to set a longitudinal direction of the receiving opening of the connector 62 vertically, position the receiving opening lower than the lens barrel 12, and orient the receiving opening to the housing opening 16.

Even in the board holding device 61 constructed above, the optical axis of the imaging optical system 11 and the surface of the circuit board 60 are oriented substantially perpendicular with one another. The lens barrel 12 partially enters the cutout 60a. It is possible with the circuit board 60 and the board holding device 61 to obtain effects similar to the above-described embodiment.

Although the board holding device 61 is so disposed as to form the insert portion 60b lower than the cutout 60a and position the receiving opening lower than the lens barrel 12 in the example of FIGS. 6 and 7, it is possible in contrast with this to dispose the board holding device 61 so as to form the insert portion 60b on an upper side of the cutout 60a and position the receiving opening higher than the lens barrel 12. Furthermore, two board holding devices 61 can be used so as to form the insert portion 60b on each of upper and lower sides of the cutout 60a and position the receiving opening in each of upper and lower sides of the lens barrel 12.

In the above embodiment, the cutouts 21a-24a of the substantially semicircular shape are formed in respectively the circuit boards 21-24. However, the shape of the cutouts 21a-24a can be an arcuate shape, U shape, polygonal shape or the like as desired for enabling partial entry of the lens barrel 12.

Second Embodiment

Figure 8:
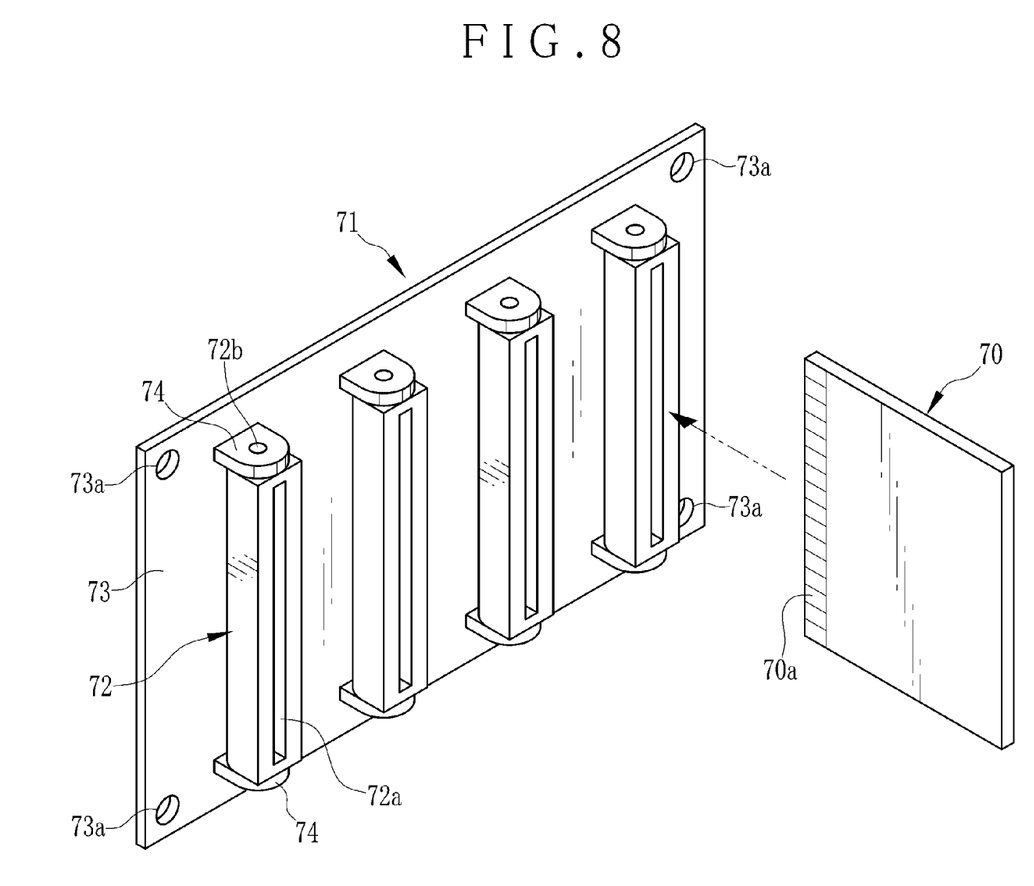
FIG. 8 is a perspective illustrating a second embodiment in which a connector is rotatable.
Figure 9:
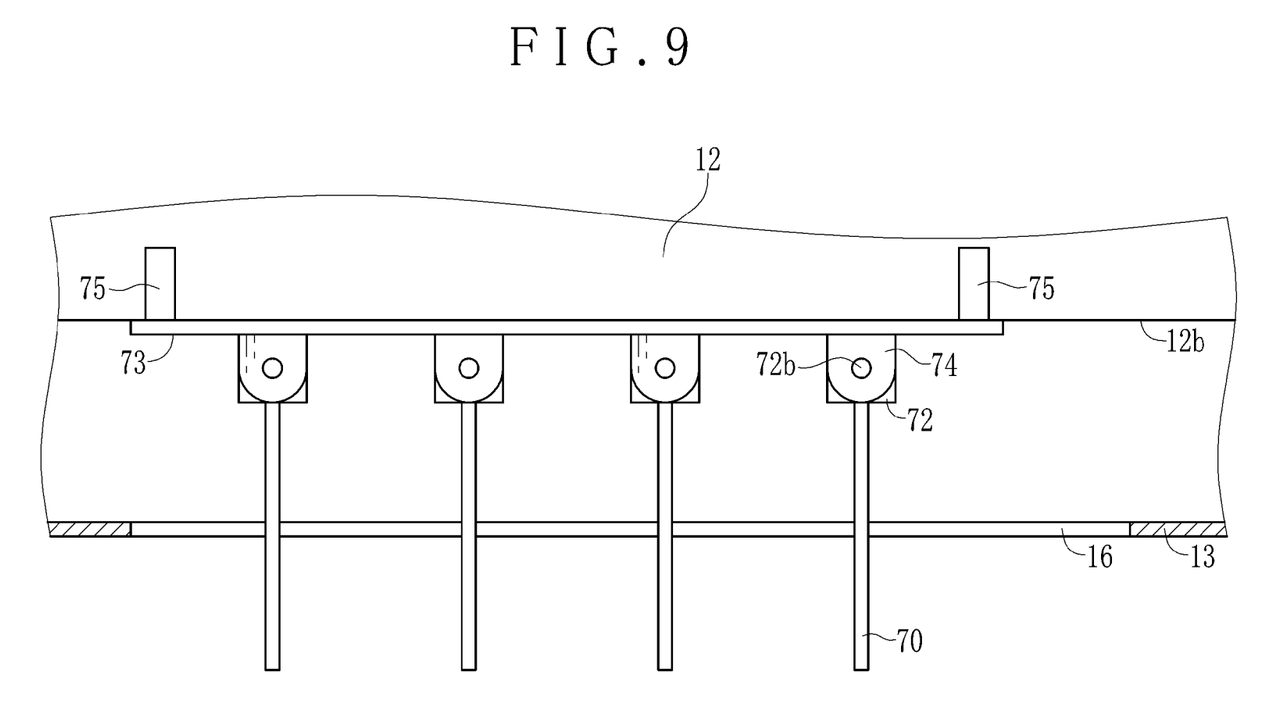
FIG. 9 is an explanatory view illustrating a state of the connector set in a first position.
Figure 10:
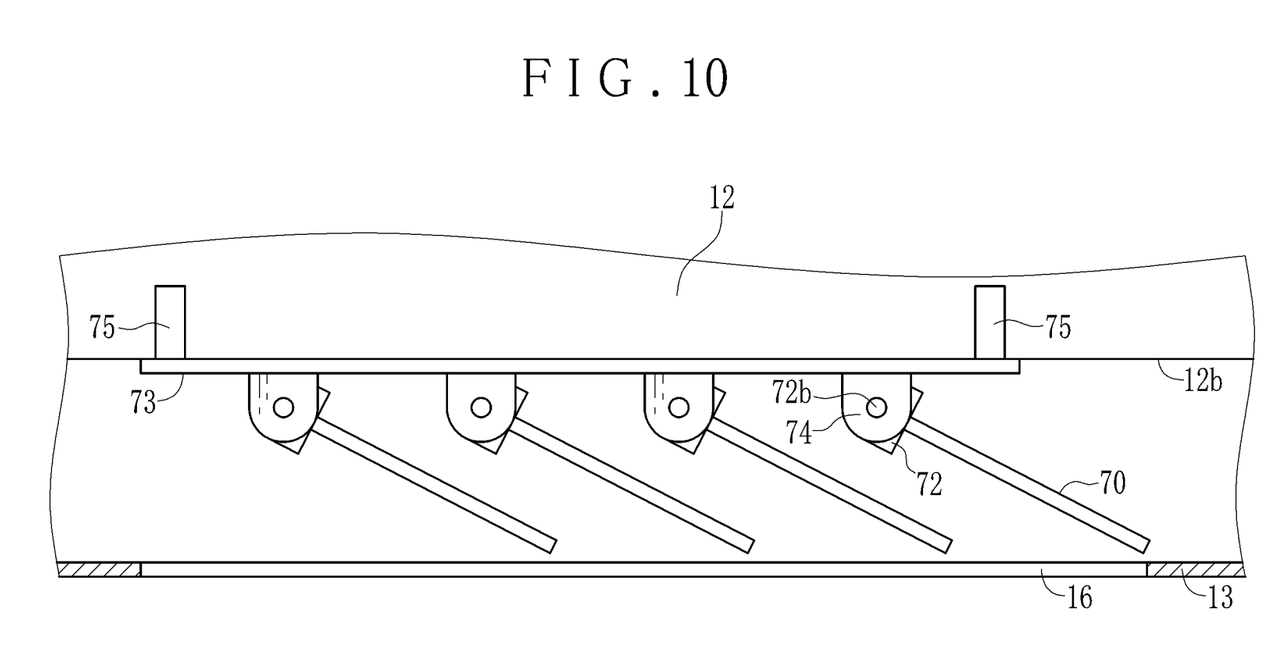
FIG. 10 is an explanatory view illustrating a state of the connector set in a second position.

A second embodiment of the present invention as illustrated in FIGS. 8-10 is described next. Elements of which a function and structure are the same as those of the above-described first embodiment are designated with identical reference numerals, their explanation being omitted. A circuit board 70 is quadrilateral. An insert portion 70a with plural electrodes is formed with one of side lines of the circuit board 70 of a plate shape.

A board holding device 71 is constituted by four connectors 72 and a wiring board 73. A quadrilateral receiving opening 72a is formed in each of the connectors 72 in compliance with a shape of the insert portion 70a of the circuit board 70. Rotational shafts 72b are formed at respectively ends of each of the connectors 72. The rotational shafts 72b are received in a rotatable manner in through holes in a pair of flanges 74 formed on the wiring board 73. Each of the connectors 72 is supported by the pair of the flanges 74 in a rotatable manner, and is so attached to the wiring board 73 that longer side lines of the receiving openings 72a extend in parallel with one another.

Through holes 73a are formed at four corners of the wiring board 73. As illustrated in FIG. 9, four bosses 75 are formed on the lateral surface of the lens barrel 12 and positioned in association with respectively the through holes 73a. The board holding device 71 is attached to a lateral side of the rear portion 12b of the lens barrel 12 by engaging the through holes 73a of the wiring board 73 with respectively the bosses 75, so that the connectors 72 are arranged in the optical axis direction in a state of orienting the receiving opening 72a to the housing opening 16, and that a center of each receiving opening 72a is positioned substantially as high as the central axis of the lens barrel 12.

Each of the connectors 72 is supported on the wiring board 73 in a rotatable manner by the flanges 74, and rotates between a first position of orienting the receiving opening 72a to the housing opening 16 as illustrated in FIG. 9 and a second position of inclining the receiving opening 72a with respect to the housing opening 16 as illustrated in FIG. 10.

To couple the circuit board 70 to the board holding device 71, the lid 17 is opened and then the connector 72 is returned to the first position. The circuit board 70 is inserted in the board holding device 71. Then the connector 72 is shifted to the second position to contain the circuit board 70 in the housing 13. Finally, the lid 17 is closed.

Consequently, the circuit board 70 of the greater width than the space between the lens barrel 12 and the housing 13 can be used as the circuit board 70 is contained with an inclination. The space between the lens barrel 12 and the housing 13 can be utilized effectively. To mount and dismount the circuit board 70, the connector 72 is returned to the first position. The circuit board 70 can be mounted and dismounted easily, as the circuit board 70 can be moved in and out in a direction perpendicular to the housing opening 16.

Third Embodiment

Figure 11:
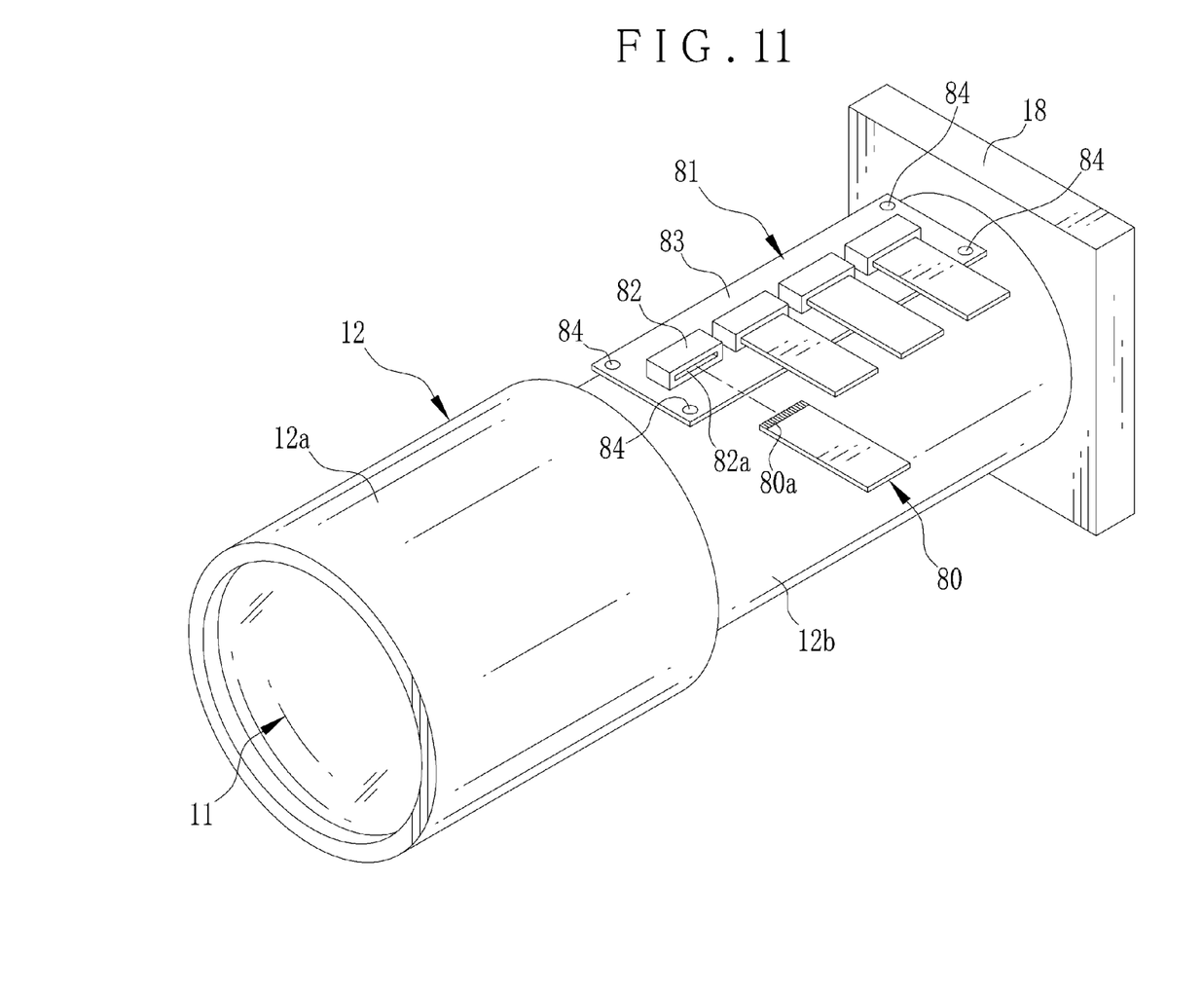
FIG. 11 is a perspective illustrating a third embodiment in which a circuit board is inserted in a tangential direction of the lens barrel.

A third embodiment of the present invention as illustrated in FIG. 11 is described next. A circuit board 80 is quadrilateral. An insert portion 80a with plural electrodes is formed with one of shorter side lines of the circuit board 80.

A board holding device 81 is constituted by a wiring board 83 and four connectors 82 attached thereto. A quadrilateral receiving opening 82a is formed in each of the connectors 82 in compliance with a shape of the insert portion 80a of the circuit board 80. Each of the connectors 82 is so attached to the wiring board 83 that the receiving opening 82a is oriented in parallel with the surface of the wiring board 83 and the receiving opening 82a are aligned.

Through holes are formed at four corners of the wiring board 83, and receive insertion of respectively bosses 84 on the lens barrel 12, so that the wiring board 83 is attached to a lateral upper side of the rear portion 12b of the lens barrel 12 in a tangential direction. The connectors 82 are arranged in the optical axis direction in a state of orienting the receiving opening 82a to the housing opening 16.

It is possible in the third embodiment to obtain effects similar to the first embodiment. The board holding device 81, although disposed higher than the lens barrel 12, can be disposed lower than the lens barrel 12. Also, the board holding device 81 can be disposed on each of upper and lower sides of the lens barrel 12.

In the above embodiments, the focus control circuit 54, the zoom control circuit 55 or the like is formed on the circuit board. However, other electronic circuits can be formed. For example, an extender control circuit for controlling a change in the magnification of an extending mechanism is formed on a circuit board assuming that the extending mechanism is used for changing the magnification by setting one of the plural zooming lenses on an optical axis.

Also, it is possible to use a diagnosis device for diagnosis as to whether the focus control circuit 54, the zoom control circuit 55 or the like on the circuit boards operates suitably, or a network connection device for connecting the television lens apparatus to the Internet or other network, so that a result of the diagnosis of the diagnosis device can be transmitted by the network to an external server or the like. Thus, it is possible on a manufacturer side to manage a status of operation or occurrence of breakage of the circuit boards in the television lens apparatus installed in a studio or the like. Maintainability can be increased. Note that the diagnosis device and the network connection device can be disposed on a circuit board disposed in a stationary manner in the housing in place of being disposed on the removable circuit board.

In each of the above embodiments, the plural connectors are disposed on the board holding device. The plural circuit boards are directly inserted in the connectors to support the circuit boards on the board holding device. However, the method of supporting the circuit boards is not limited to this. For example, an adapter capable of supporting the circuit boards is used and supported on the board holding device of a television lens apparatus. Thus, it is possible to interconnect the circuit boards and the board holding device electrically and mechanically by use of the adapter.

The number of the circuit boards is not limited to four but can be 1-3 or 5 or higher. Also, the circuit boards are the common electronic circuits in the above embodiments. Their function is changed according to the use. However, special circuit boards can be used as designed separately between the functions.

In each of the above embodiments, the lid 17 rotatable about the optical axis direction is used. However, rotational shafts of the lid 17 can be directed in any direction as desired. Also, the lid 17, without limitation to one for rotating about hinges, can be moved between the open and closed positions by sliding or the like. Furthermore, the lid 17 can be a removable lid for closing the housing opening 16 upon being fitted on the housing 13 and for uncovering the housing opening 16 upon being removed from the housing 13.

In each of the above embodiments, the lens barrel 12 of the cylindrical shape is illustrated. However, a shape of the lens barrel 12 can be a prismatic tube or elliptic cylinder. To this end, the rear portion 12b can have a less wide shape than the front portion 12a.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A television lens apparatus having an imaging optical system for focusing an object image, a lens barrel for holding said imaging optical system, and a housing for covering and protecting said imaging optical system and said lens barrel, said television lens apparatus comprising:
    plural circuit boards for controlling said television lens apparatus, each of said circuit boards being substantially in a plate shape, wherein a cutout is formed in one side line of each of said circuit boards in compliance with a shape of said lens barrel, and an insert portion is formed near to a center of said cutout;
    a board holding device for holding said circuit boards removably to contain said plural circuit boards in a space between said lens barrel and said housing, wherein said board holding device includes plural connectors positioned in alignment with an optical axis of said imaging optical system and having a receiving opening for entry of said insert portion, and a wiring board for electrical connection with said circuit boards entered in respectively said connectors, wherein said board holding device is mounted on a lateral surface of said lens barrel to set a center of said respective receiving opening at a height substantially equal to a height of a central axis of said lens barrel;
    a housing opening, formed in said housing, for enabling mounting and dismounting of said plural circuit boards with said board holding device; and
    a lid for opening and closing said housing opening.

2. A television lens apparatus as defined in claim 1, wherein said lens barrel is cylindrical with a front portion of a large diameter and a rear portion of a small diameter, and said board holding device is mounted on said rear portion; and
    said housing is in a shape of a prismatic tube.

3. A television lens apparatus as defined in claim 1, wherein said connectors support said circuit boards in a state substantially perpendicular to said optical axis.

4. A television lens apparatus as defined in claim 1, wherein each of said connectors is coupled to said wiring board in a rotatable manner between a first position for orienting said receiving opening to said housing opening and a second position for inclining said receiving opening relative to said housing opening.

5. A television lens apparatus as defined in claim 1, wherein said connectors support respectively said circuit boards in a direction of setting surfaces of said circuit boards substantially in parallel with said optical axis and substantially flush with one another.

6. A television lens apparatus as defined in claim 1, wherein said lid is coupled to said housing in a rotatable manner to move between an open position for uncovering said housing opening to enable mounting and dismounting of said circuit boards and a closed position for closing said housing opening.

7. A television lens apparatus as defined in claim 1, wherein each of said circuit boards includes an adjustable circuit device in which an electronic circuit as desired is settable with software, and said circuit boards are boards with a common shape and common electrical structure.

8. A television lens apparatus as defined in claim 7, wherein said imaging optical system has a focus lens, a zoom lens, a correction lens, a relay lens and an iris device.

9. A television lens apparatus as defined in claim 8, wherein said plural circuit boards are set in any one of electronic circuits including a focus control circuit for moving said focus lens for focus adjustment, a zoom control circuit for moving said zoom lens and said correction lens for magnification adjustment, and an iris control circuit for controlling said iris device.

10. A television lens apparatus as defined in claim 1, wherein said circuit boards are respectively common circuit boards of which a shape and electrical structure are equal.

\* \* \* \* \*